United States Patent
Choi et al.

(10) Patent No.: US 9,860,674 B1
(45) Date of Patent: Jan. 2, 2018

(54) MANAGEMENT OF MACHINE-TO-MACHINE TRAFFIC IN A WIRELESS COMMUNICATION NETWORK

(71) Applicant: Sprint Communications Company L.P., Overland Park, KS (US)

(72) Inventors: Heesook Choi, Castro Valley, CA (US); Kosol Jintaseranee, Millbrae, CA (US); Mark Evans, El Granada, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 584 days.

(21) Appl. No.: 14/021,019

(22) Filed: Sep. 9, 2013

(51) Int. Cl.
 *G06F 15/16* (2006.01)
 *H04W 4/00* (2009.01)

(52) U.S. Cl.
 CPC .................. *H04W 4/005* (2013.01)

(58) Field of Classification Search
 CPC .................................................. H04W 4/005
 See application file for complete search history.

(56) References Cited

U.S. PATENT DOCUMENTS

| | | | | |
|---|---|---|---|---|
| 5,974,312 A * | 10/1999 | Hayes, Jr. | ............ | H04W 8/245 455/418 |
| 6,002,935 A * | 12/1999 | Wang | ............ | H04W 16/02 455/446 |
| 2008/0013480 A1* | 1/2008 | Kapoor | ............ | H04L 5/14 370/328 |
| 2008/0107061 A1* | 5/2008 | Tao | ............ | H04L 47/10 370/315 |
| 2012/0057476 A1 | 3/2012 | Chan et al. | | |
| 2012/0127973 A1* | 5/2012 | Lin | ............ | H04L 1/1854 370/338 |
| 2012/0195216 A1* | 8/2012 | Wu | ............ | H04W 72/0486 370/252 |
| 2012/0213185 A1 | 8/2012 | Frid | | |
| 2012/0254890 A1 | 10/2012 | Li et al. | | |
| 2013/0225168 A1* | 8/2013 | Singh | ............ | H04W 8/005 455/435.1 |
| 2014/0349660 A1* | 11/2014 | Abdalla | ............ | H04W 72/048 455/450 |

* cited by examiner

*Primary Examiner* — Tauqir Hussain
*Assistant Examiner* — Austin Moreau (57) ABSTRACT

A wireless access node to manage machine-to-machine data transmissions comprises a processing system, a wireless communication transceiver, and a communication transceiver. The processing system is configured to allocate a plurality of machine-to-machine channels reserved for machine-to-machine communications, and assign individual quality of service levels to individual ones of the machine-to-machine channels per sector. The wireless communication transceiver is configured to receive machine-to-machine traffic on one of the machine-to-machine channels. The processing system is configured to determine a quality of service level for the machine-to-machine traffic based on the sector and the machine-to-machine channel over which the machine-to-machine traffic was received. The communication transceiver is configured to transfer the machine-to-machine traffic for delivery to a machine-to-machine server based on the quality of service level for the machine-to-machine traffic.

20 Claims, 5 Drawing Sheets

MANAGEMENT OF MACHINE-TO-MACHINE TRAFFIC IN A WIRELESS COMMUNICATION NETWORK

TECHNICAL BACKGROUND

The use of wireless communication devices to send and receive information has become increasingly prominent. For example, individuals may utilize communication networks for voice communications, research, entertainment, or for conducting critical business transactions. In addition to these human users, unmanned machines may also be configured to transmit data to other machines. For example, various appliances, toys, vehicles, and other machines could be configured to wirelessly transmit usage information and other data for collection in a database. Interested parties can then access and process the collected usage information from these machines in order to gain some perspective about their use. Likewise, updates and other information may be pushed to machines periodically in order to provide new data for the machine. However, such data transfers are not typically time-sensitive and a certain amount of delay in the transfer of the data is often acceptable.

As the number of unmanned machines that are configured to automatically transmit machine-to-machine traffic continues to rise, demand on the wireless communication network to service these request also increases. For example, there may be hundreds or thousands of machine-to-machine devices located in a single sector coverage area of a base station. However, such devices typically generate and transmit very small amounts of data infrequently, but registering these machines onto the network every time one of the machines requires a data service is very inefficient and consumes valuable network resources.

Overview

A method of operating a wireless access node to manage machine-to-machine data transmissions is disclosed. The method comprises allocating a plurality of machine-to-machine channels reserved for machine-to-machine communications. The method further comprises assigning individual quality of service levels to individual ones of the machine-to-machine channels per sector. The method further comprises wirelessly receiving machine-to-machine traffic on one of the machine-to-machine channels. The method further comprises determining a quality of service level for the machine-to-machine traffic based on the sector and the machine-to-machine channel over which the machine-to-machine traffic was received. The method further comprises transferring the machine-to-machine traffic for delivery to a machine-to-machine server based on the quality of service level for the machine-to-machine traffic.

A wireless access node to manage machine-to-machine data transmissions comprises a processing system, a wireless communication transceiver, and a communication transceiver. The processing system is configured to allocate a plurality of machine-to-machine channels reserved for machine-to-machine communications, and assign individual quality of service levels to individual ones of the machine-to-machine channels per sector. The wireless communication transceiver is configured to receive machine-to-machine traffic on one of the machine-to-machine channels. The processing system is configured to determine a quality of service level for the machine-to-machine traffic based on the sector and the machine-to-machine channel over which the machine-to-machine traffic was received. The communication transceiver is configured to transfer the machine-to-machine traffic for delivery to a machine-to-machine server based on the quality of service level for the machine-to-machine traffic.

A computer apparatus to manage machine-to-machine data transmissions comprises software instructions and at least one non-transitory computer-readable storage medium storing the software instructions. The software instructions are configured, when executed by a wireless access node, to direct the wireless access node to allocate a plurality of machine-to-machine channels reserved for machine-to-machine communications. The software instructions are further configured to direct the wireless access node to assign individual quality of service levels to individual ones of the machine-to-machine channels per sector. The software instructions are further configured to direct the wireless access node to wirelessly receive machine-to-machine traffic on one of the machine-to-machine channels. The software instructions are further configured to direct the wireless access node to determine a quality of service level for the machine-to-machine traffic based on the sector and the machine-to-machine channel over which the machine-to-machine traffic was received. The software instructions are further configured to direct the wireless access node to transfer the machine-to-machine traffic for delivery to a machine-to-machine server based on the quality of service level for the machine-to-machine traffic.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
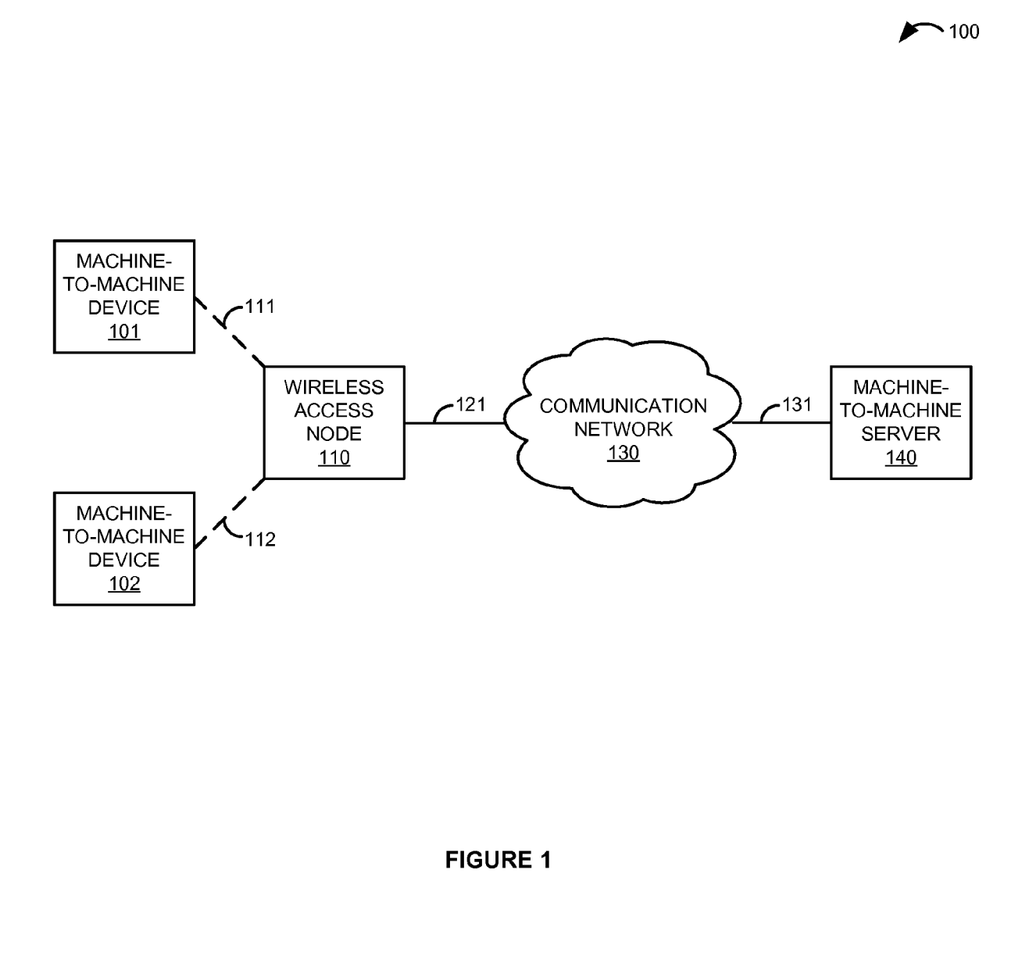
FIG. 1 is a block diagram that illustrates a communication system.

FIG. 1 is a block diagram that illustrates communication system 100. Communication system 100 includes machine-to-machine devices 101 and 102, wireless access node 110, communication network 130, and machine-to-machine server 140. Machine-to-machine device 101 and wireless access node 110 are in communication over wireless communication link 111. Likewise, machine-to-machine device 102 and wireless access node 110 are in communication over wireless communication link 112. Machine-to-machine devices 101 and 102 could each comprise any machine having wireless communication capabilities that is not operated by a human operator. Wireless access node 110 and communication network 130 communicate over communication link 121. Communication network 130 and machine-to-machine server 140 are in communication over communication link 131. Note that there would typically be large numbers of machine-to-machine devices in a sector coverage area of wireless access node 110, but only two machine-to machine devices 101 and 102 are shown in FIG. 1 for clarity.

Figure 2:
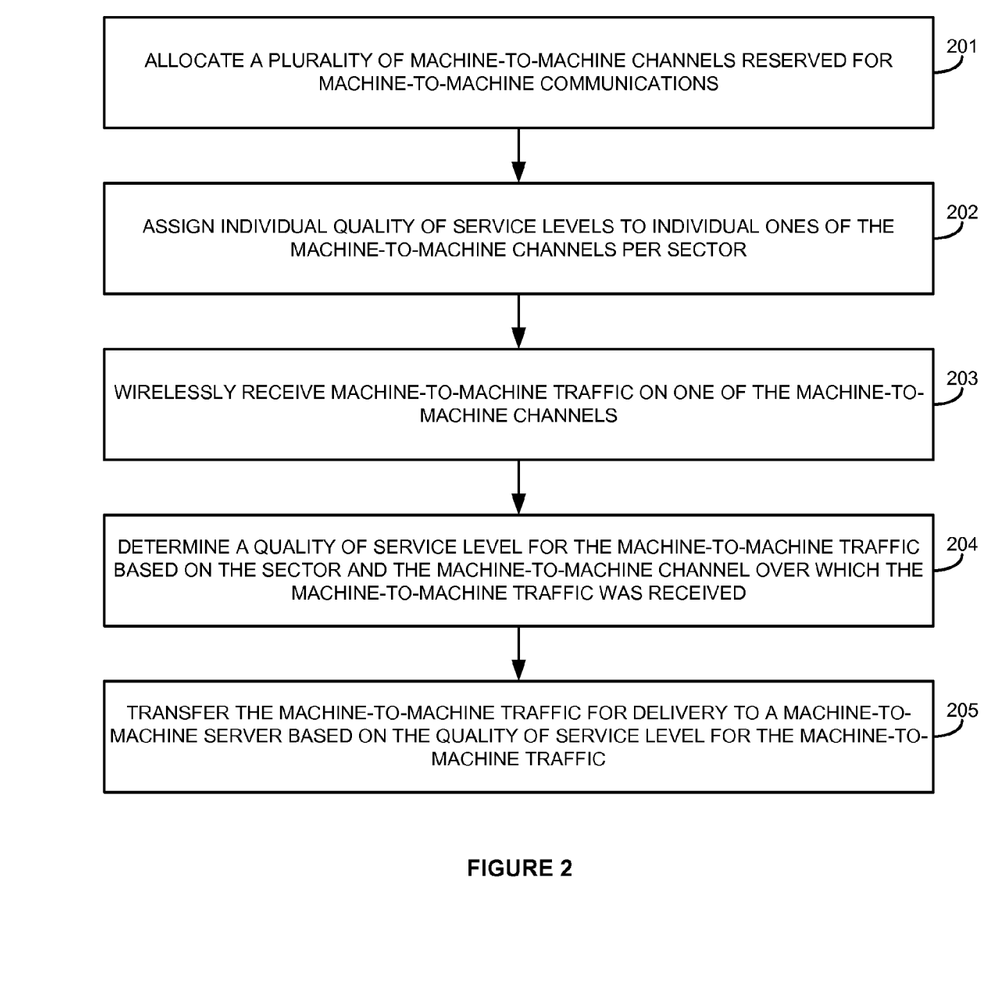
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless access node 110 to manage machine-to-machine data transmissions.

To begin, wireless access node 110 allocates a plurality of machine-to-machine channels reserved for machine-to-machine communications (201). Typically, only machine-to-machine devices will utilize the machine-to-machine channels to transmit machine-to-machine communications, but machine-to-machine channels could be used by other wireless communication devices in some examples, including devices controlled by human operators. In some examples, when allocating the plurality of machine-to-machine channels reserved for the machine-to-machine communications, wireless access node 110 could assign individual timeslots of the machine-to-machine channels to individual machine-to-machine devices, such as machine-to-machine devices 101 and 102. The machine-to-machine channels could comprise any RF communication channel, including a random access channel, a signaling channel, a paging channel, or any other wireless communication channel provided by wireless access node 110.

Wireless access node 110 assigns individual quality of service levels to individual ones of the machine-to-machine channels per sector (202). Typically, a different quality of service level is assigned to each of the machine-to-machine channels in a given sector. For example, if wireless access node 110 provides three machine-to-machine channels in a sector, these machine-to-machine channels could be individually assigned to low, medium, and high levels of quality of service. In some examples, the quality of service level assigned to a particular machine-to-machine channel could be based on the sector associated with the machine-to-machine channel. For example, machine-to-machine channels in some sectors could be assigned higher quality of service levels than machine-to-machine channels in other sectors, and these determinations could be based on the geographic locations of the sectors, demographic information associated with the sectors, commercial entities that utilize the sectors, and any other factors. Other techniques of assigning machine-to-machine channels to different quality of service levels are possible and within the scope of this disclosure.

Wireless access node 110 wirelessly receives machine-to-machine traffic on one of the machine-to-machine channels (203). The machine-to-machine traffic typically originates at machine-to-machine devices 101 and 102. The machine-to-machine traffic is commonly generated automatically by machine-to-machine devices 101 and 102 on a periodic schedule for transmission to wireless access node 110 on the assigned machine-to-machine channels that are reserved for machine-to-machine communications. The machine-to-machine traffic transferred by machine-to-machine devices 101 and 102 typically comprises data packets having machine-to-machine communications in the packet payload, and could include a machine-to-machine indicator in the packet header that identifies the packet as machine-to-machine traffic in some examples.

Wireless access node 110 determines a quality of service level for the machine-to-machine traffic based on the sector and the machine-to-machine channel over which the machine-to-machine traffic was received (204). Typically, since each machine-to-machine channel is assigned a different quality of service level per sector, wireless access node 110 determines the quality of service level for the machine-to-machine traffic depending on which machine-to-machine channel is used by the machine-to-machine devices 101 and 102 to transmit the machine-to-machine traffic. In some examples, as part of determining the quality of service level for the machine-to-machine traffic, wireless access node 110 may aggregate the machine-to-machine traffic based on the quality of service level for the machine-to-machine traffic. For example, wireless access node 110 may aggregate the machine-to-machine traffic received on all sectors over all machine-to-machine channels into groups of either low, medium, or high quality of service according to the quality of service level associated with the machine-to-machine channel and the sector over which the machine-to-machine traffic was received.

Wireless access node 110 transfers the machine-to-machine traffic for delivery to machine-to-machine server 140 based on the quality of service level for the machine-to-machine traffic (205). Machine-to-machine server 140 therefore typically receives the machine-to-machine traffic sorted by the quality of service level assigned to it by wireless access node 110. In some examples, wireless access node 110 could prioritize the transfer of the machine-to-machine traffic to machine-to-machine server 140 based on the quality of service level for the machine-to-machine traffic by transferring the machine-to-machine traffic having higher quality of service levels first and holding the machine-to-machine traffic having lower quality of service levels until network resources are more readily available and/or less expensive to utilize, such as during off-peak hours.

Advantageously, wireless access node 110 reserves machine-to-machine channels that are each assigned a different quality of service level for machine-to-machine traffic transmitted by machine-to-machine devices. By assigning a quality of service level to the machine-to-machine traffic based on the sector and the machine-to-machine channel over which the machine-to-machine traffic is received, wireless access node 110 may aggregate the machine-to-machine traffic into different groups according to their quality of service levels. In this manner, wireless access node 110 may transfer the machine-to-machine traffic for delivery to machine-to-machine server 140 based on the quality of service level for the machine-to-machine traffic, allowing the machine-to-machine server 140 to receive the machine-to-machine traffic pre-sorted by quality of service level.

Referring back to FIG. 1, machine-to-machine devices 101 and 102 individually comprise any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Machine-to-machine devices 101 and 102 may also include a user interface, memory system, software, processing circuitry, or some other communication components. For example, machine-to-machine devices 101 and 102 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by machine-to-machine devices 101 and 102 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between machine-to-machine devices 101 and 102 and wireless access node 110.

Wireless access node 110 comprises RF communication circuitry and an antenna. The RF communication circuitry typically includes an amplifier, filter, RF modulator, and signal processing circuitry. Wireless access node 110 may also comprise a router, server, memory device, software, processing circuitry, cabling, power supply, network communication interface, structural support, or some other communication apparatus. Wireless access node 110 could comprise a base station, Internet access node, telephony service node, wireless data access point, or some other wireless communication system—including combinations thereof. Some examples of wireless access node 110 include a base transceiver station (BTS), base station controller (BSC), radio base station (RBS), Node B, enhanced Node B (eNodeB), and others—including combinations thereof. Wireless network protocols that may be utilized by wireless access node 110 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Machine-to-machine server 140 comprises a processing system and communication transceiver. Machine-to-machine server 140 may also include other components such as a router, server, data storage system, and power supply. Machine-to-machine server 140 may reside in a single device or may be distributed across multiple devices. Machine-to-machine server 140 may be a discrete system or may be integrated within other systems—including other systems within communication system 100. In some examples, machine-to-machine server 140 could comprise a home agent, packet data serving node (PDSN), network switch, mobile switching center, router, switching system, packet gateway, network gateway system, Internet access node, application server, service node, firewall, or some other communication system—including combinations thereof.

Wireless communication links 111 and 112 use the air or space as the transport medium. Wireless communication links 111 and 112 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111 and 112 may each comprise many different signals sharing the same link. For example, wireless communication links 111 and 112 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
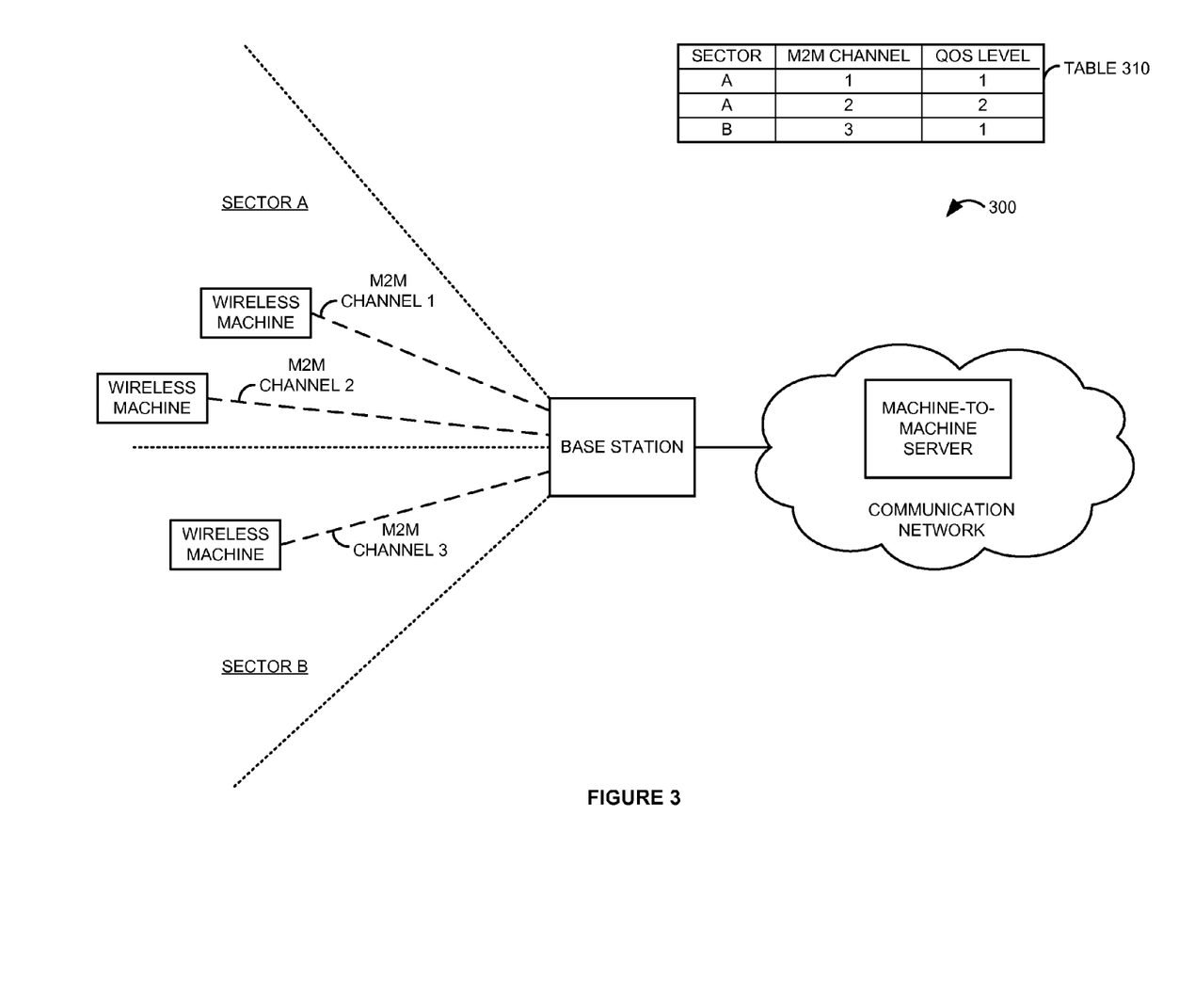
FIG. 3 is a block diagram that illustrates a communication system in an exemplary embodiment.

FIG. 3 is a block diagram that illustrates communication system 300 in an exemplary embodiment. Communication system 300 includes a plurality of wireless machines, a base station, and a communication network. The wireless machines are located in coverage areas of sectors A and B provided by the base station. The wireless machines could comprise parking meters, health devices, utility meters, vehicles, industrial equipment, or any other type of machine with wireless communication capabilities. The wireless machines and the base station communicate over machine-to-machine (M2M) channels that are reserved for machine-to-machine traffic. As shown in FIG. 3, sector A includes M2M channels 1 and 2, and sector B includes M2M channel 3. The communication network includes a machine-to-machine server that typically receives the machine-to-machine traffic from the base station for processing, storage, and/or further distribution.

Each M2M channel is assigned a different quality of service (QOS) level per sector. Table 310 shown on FIG. 3 defines the QOS levels that are assigned to the M2M channels. In particular, M2M channel 1 of sector A has a QOS level of 1, M2M channel 2 of sector A has a QOS level of 2, and M2M channel 3 of sector B has a QOS level of 1. An exemplary operation of communication system 300 will now be described in greater detail with respect to FIG. 4.

Figure 4:
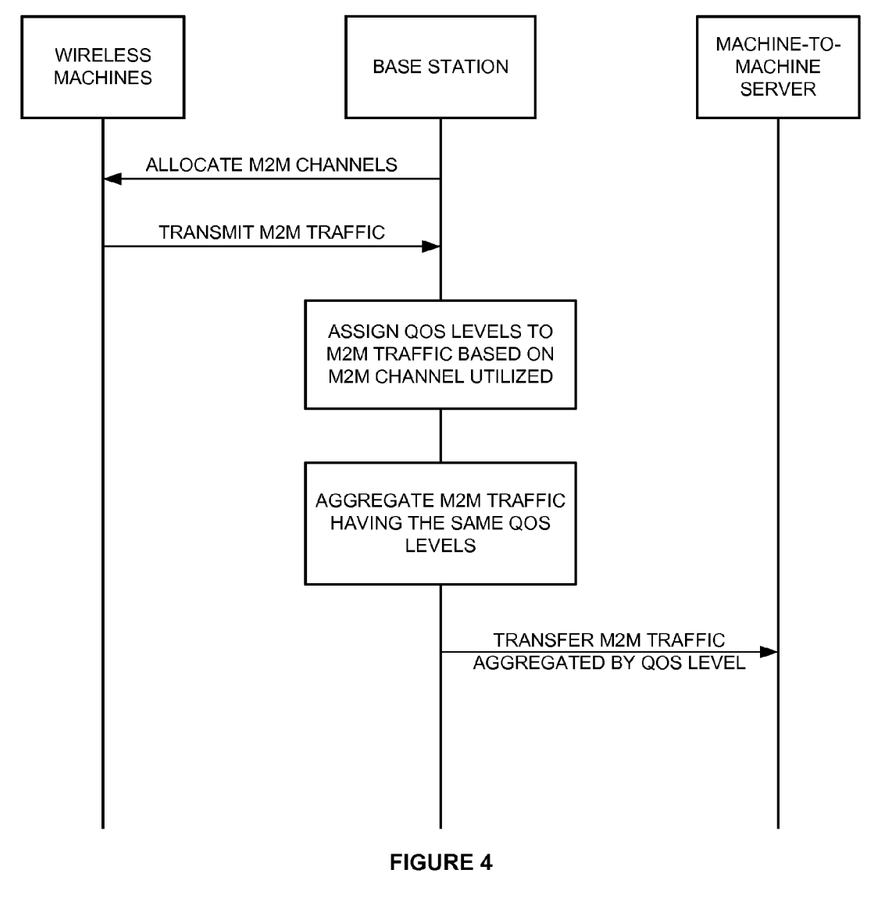
FIG. 4 is a sequence diagram that illustrates an operation of a communication system in an exemplary embodiment.

FIG. 4 is a sequence diagram that illustrates an operation of communication system 300 in an exemplary embodiment. Initially, the base station allocates machine-to-machine communication channels for machine-to-machine traffic associated with the wireless machines. The machine-to-machine channels may include both a forward link for receiving traffic from the wireless machines and a reverse link for transmitting data to the machines. A machine-to-machine channel is typically reserved for all wireless machines in the sector associated with the channel. As discussed above with respect to FIG. 3, each machine-to-machine channel in each sector is assigned a quality of service level. All wireless machines in a sector requiring a quality of service level matching the quality of service level assigned to a particular machine-to-machine channel will share that channel to transmit and receive data.

After the machine-to-machine channels are allocated, the wireless machines transmit machine-to-machine traffic using the appropriate assigned channel. In this example, wireless machines transmit data on machine-to-machine channels 1 and 2 in sector A, and on machine-to-machine channel 3 in sector B. Since access to the machine-to-machine channels may be shared by every machine device in a sector, a solution should be implemented to handle the possibility of two or more devices attempting to utilize a machine-to-machine channel simultaneously. One possible solution involves the use of time-division multiplexing, where within the assigned channel, the base station or a network resource controller assigns a time slot to each of the machine-to-machine devices, and whenever a machine-to-machine device needs to transmit data on the channel, it may be sent on its assigned timeslot. If individual timeslots are not assigned to individual machine devices, a situation may occur where two or more machine devices attempt to transmit machine-to-machine traffic using the same timeslot. In this case, if multiple machine-to-machine devices transmit machine-to-machine traffic on one of the machine-to-machine channels and a collision occurs, the machine-to-machine devices may be configured to each utilize a random timer to individually wait random amounts of time before attempting to retransmit the machine-to-machine traffic.

Once the base station receives the machine-to-machine traffic on one or more of the machine-to-machine channels, the base station assigns quality of service levels to the machine-to-machine traffic based on the machine-to-machine channel utilized to transmit the data. In this example, machine-to-machine traffic received from wireless machines on machine-to-machine channel 1 of sector A would be assigned a quality of service level of 1, machine-to-machine traffic received on channel 2 of sector A would be assigned a quality of service level of 2, and machine-to-machine traffic received on channel 3 of sector B would be assigned a quality of service level of 1.

The machine-to-machine traffic is then aggregated into groups having the same quality of service levels. In this example, since traffic received on machine-to-machine channel 1 of sector A and machine-to-machine channel 3 of sector B have both been assigned a quality of service level of 1, all traffic received on both channels 1 and 3 would be aggregated by applying the same quality of service level. The base station would proceed to aggregate machine-to-machine traffic received on all machine-to-machine channels on all sectors in this manner.

Once the machine-to-machine traffic is aggregated by quality of service level, the base station transmits the aggregated machine-to-machine traffic over a backhaul link for delivery to a machine-to-machine server. The machine-to-machine server may then proceed to process, store, and possibly further transmit the machine-to-machine traffic to other interested parties. In this manner, the wireless machines are able to transmit machine-to-machine traffic whenever necessary by utilizing the assigned machine-to-machine channels, which reduces the burden on other communication channels provided by the base station for human user communications. Since each machine-to-machine channel is associated with a particular quality of service level, the received machine-to-machine traffic may be managed efficiently by applying the same quality of service level to all traffic received on a given channel.

Figure 5:
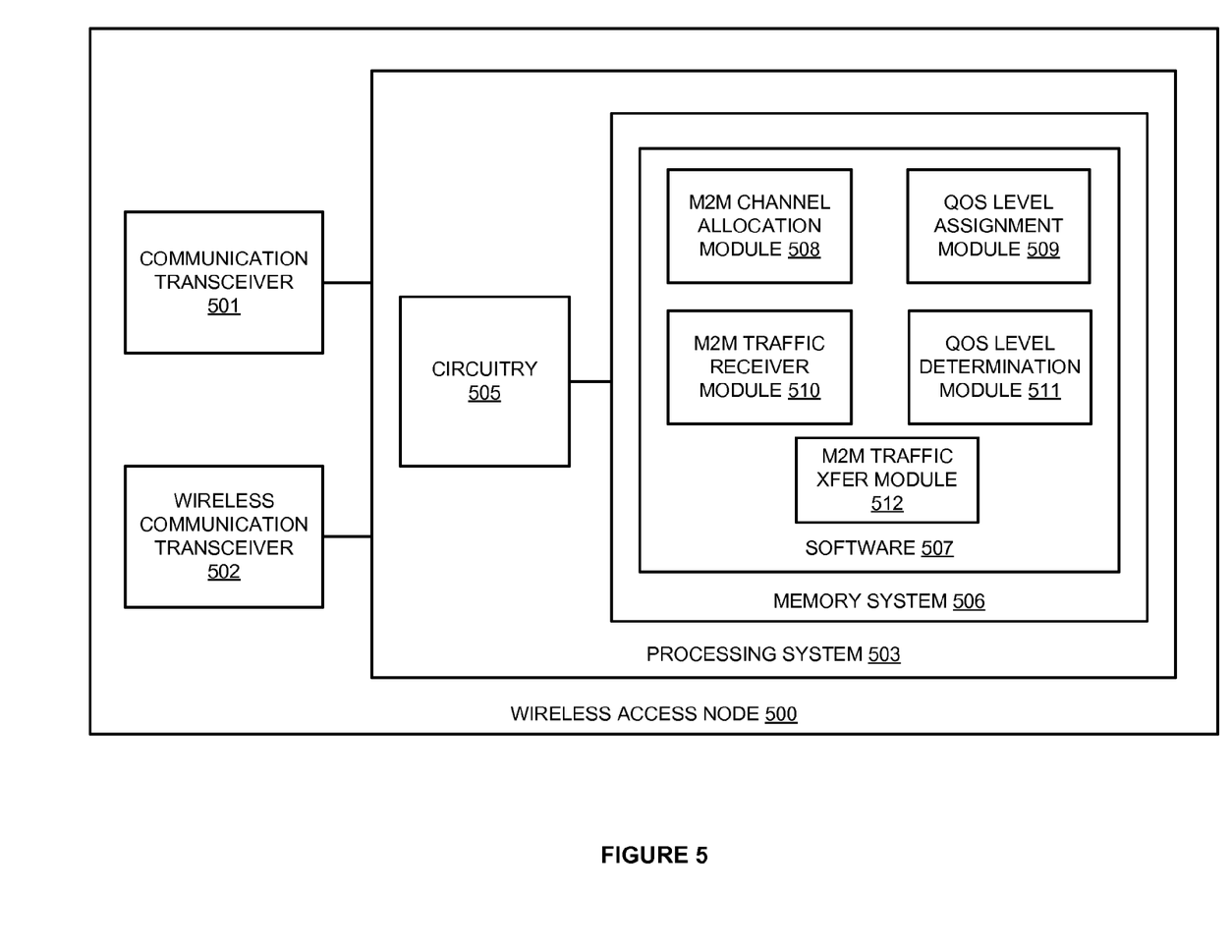
FIG. 5 is a block diagram that illustrates a wireless access node.

FIG. 5 is a block diagram that illustrates wireless access node 500. Wireless access node 500 provides an example of wireless access node 110, although node 110 may have alternative configurations. Wireless access node 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-512.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof. Communication transceiver 501 could be configured to transfer machine-to-machine traffic for delivery to a machine-to-machine server based on the quality of service level for the machine-to-machine traffic.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 502 could be configured to wirelessly receive machine-to-machine traffic on one of the machine-to-machine channels.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-512, although software 507 could have alternative configurations in other examples.

When executed by circuitry 505, operating software 507 directs processing system 503 to operate as described herein for wireless access node 110. In particular, operating software 507 may direct processing system 503 to allocate a plurality of machine-to-machine channels reserved for machine-to-machine communications. Operating software 507 directs processing system 503 to assign individual quality of service levels to individual ones of the machine-to-machine channels per sector. In addition, operating software 507 may direct wireless communication transceiver 502 to wirelessly receive machine-to-machine traffic on one of the machine-to-machine channels. Operating software 507 further directs processing system 503 to determine a quality of service level for the machine-to-machine traffic based on the sector and the machine-to-machine channel over which the machine-to-machine traffic was received. Finally, operating software 507 may direct processing system 503 to direct communication transceiver 501 to transfer the machine-to-machine traffic for delivery to a machine-to-machine server based on the quality of service level for the machine-to-machine traffic.

In this example, operating software 507 comprises a machine-to-machine channel allocation software module 508 that allocates a plurality of machine-to-machine channels reserved for machine-to-machine communications. In addition, operating software 507 comprises a quality of service level assignment software module 509 that assigns individual quality of service levels to individual ones of the machine-to-machine channels per sector. Operating software 507 also comprises a machine-to-machine traffic receiver software module 510 that wirelessly receives machine-to-machine traffic on one of the machine-to-machine channels. Further, operating software 507 comprises a quality of service level determination software module 511 that determines a quality of service level for the machine-to-machine traffic based on the sector and the machine-to-machine channel over which the machine-to-machine traffic was received. Finally, operating software 507 comprises a machine-to-machine traffic transfer software module 512 that transfers the machine-to-machine traffic for delivery to a machine-to-machine server based on the quality of service level for the machine-to-machine traffic.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node to manage machine-to-machine data transmissions, the method comprising:
   assigning individual timeslots to individual ones of machine-to-machine channels reserved for machine-to-machine communications;
   assigning individual quality of service levels to the individual ones of the machine-to-machine channels per sector of a plurality of sectors;
   wirelessly receiving machine-to-machine traffic over the machine-to-machine channels;
   assigning the individual quality of service levels to the machine-to-machine traffic based on the individual quality of service levels assigned to the individual ones of the machine-to-machine channels over which the data was received;
   transferring the machine-to-machine traffic for delivery to a machine-to-machine server based on the individual quality of service levels for the machine-to-machine traffic; and
   determining that a plurality of machine-to-machine devices transmitting the machine-to-machine traffic on one of the machine-to-machine channels are experiencing a collision and responsively, instructing the machine-to-machine devices to each utilize a random timer to individually wait random amounts of time before attempting to retransmit the machine-to-machine traffic.

2. The method of claim 1 wherein transferring the machine-to-machine traffic for delivery to the machine-to-machine server based on the individual quality of service levels for the machine-to-machine traffic comprises transferring one or more groups of machine-to-machine traffic having higher ones of the individual quality of service levels first before transferring other groups of machine-to-machine traffic having lower ones of the individual quality of service levels.

3. The method of claim 1 wherein the machine-to-machine devices are located in a sector of the plurality of sectors that require a particular one of the individual quality of service levels and are configured to share one of the machine-to-machine channels assigned the particular one of the individual quality of service levels required by the machine-to-machine devices.

4. The method of claim 1 further comprising aggregating the data into a plurality of groups having different ones of the individual quality of service levels based on the individual quality of service levels assigned to data in the machine-to-machine traffic.

5. The method of claim 1 wherein the plurality of machine-to-machine channels comprise a random access channel.

6. The method of claim 1 wherein the plurality of machine-to-machine channels comprise a signaling channel.

7. The method of claim 1 wherein the plurality of machine-to-machine channels comprise a paging channel.

8. A wireless access node to manage machine-to-machine data transmissions, the wireless access node comprising:
   a processing system configured to assign individual timeslots to individual ones of machine-to-machine channels reserved for machine-to-machine communications, and assign individual quality of service levels to the individual ones of the machine-to-machine channels per sector of a the plurality of sectors;
   a wireless communication transceiver configured to receive machine-to-machine traffic over the machine-to-machine channels;
   the processing system configured to assign the individual quality of service levels to data in the machine-to-machine traffic based on the individual quality of service levels assigned to the individual ones of the machine-to-machine channels over which the data was received;
   a communication transceiver configured to transfer the machine-to-machine traffic for delivery to a machine-to-machine server based on the individual quality of service levels for the machine-to-machine traffic;

the processing system configured to determine that a plurality of machine-to-machine devices transmitting the machine-to-machine traffic on one of the machine-to-machine channels are experiencing a collision; and the communication transceiver configured to instruct the machine-to-machine devices to each utilize a random timer to individually wait random amounts of time before attempting to retransmit the machine-to-machine traffic.

9. The wireless access node of claim 8 wherein the communication transceiver configured to transfer the machine-to-machine traffic for delivery to the machine-to-machine server based on the individual quality of service levels for the machine-to-machine traffic comprises the communication transceiver configured to transfer one or more groups of machine-to-machine traffic having higher ones of the individual quality of service levels first before transferring other groups of machine-to-machine traffic having lower ones of the individual quality of service.

10. The wireless access node of claim 8 wherein the machine-to-machine devices are located in a sector of the plurality of sectors that require a particular one of the individual quality of service levels and are configured to share one of the machine-to-machine channels assigned the particular one of the individual quality of service levels required by the machine-to-machine devices.

11. The wireless access node of claim 8 wherein the processing system is further configured to aggregate the data into a plurality of groups having different ones of the individual quality of service levels based on the individual quality of service levels assigned to data in the machine-to-machine traffic.

12. The wireless access node of claim 8 wherein the plurality of machine-to-machine channels comprise a random access channel.

13. The wireless access node of claim 8 wherein the plurality of machine-to-machine channels comprise a signaling channel.

14. The wireless access node of claim 8 wherein the plurality of machine-to-machine channels comprise a paging channel.

15. A computer apparatus to manage machine-to-machine data transmissions, the apparatus comprising:

at least one non-transitory computer-readable storage medium storing software instructions which, when executed by a wireless access node, direct the wireless access node to assign individual timeslots to individual ones of machine-to-machine channels reserved for machine-to-machine communications, assign individual quality of service levels to the individual ones of the machine-to-machine channels per sector of a the plurality of sectors, wirelessly receive machine-to-machine traffic over the machine-to-machine channels, assign the individual quality of service levels to the machine-to-machine traffic based on the individual quality of service levels assigned to the individual ones of the machine-to-machine channels over which the data was received, transfer the machine-to-machine traffic for delivery to a machine-to-machine server based on the individual quality of service levels for the machine-to-machine traffic, determine that a plurality of machine-to-machine devices transmitting the machine-to-machine traffic on one of the machine-to-machine channels are experiencing a collision and responsively, instruct the machine-to-machine devices to each utilize a random timer to individually wait random amounts of time before attempting to retransmit the machine-to-machine traffic.

16. The apparatus of claim 15 wherein the software instructions are further configured to direct the wireless access node to transfer one or more groups of machine-to-machine traffic having higher ones of the individual quality of service levels first before transferring other groups of machine-to-machine traffic having lower ones of the individual quality of service levels.

17. The apparatus of claim 15 wherein the machine-to-machine devices are located in a sector of the plurality of sectors that require a particular one of the individual quality of service levels and are configured to share one of the machine-to-machine channels assigned the particular one of the individual quality of service levels required by the machine-to-machine devices.

18. The apparatus of claim 15 wherein the software instructions are further configured to aggregate the data into a plurality of groups having different ones of the individual quality of service levels based on the individual quality of service levels assigned to data in the machine-to-machine traffic.

19. The apparatus of claim 15 wherein the plurality of machine-to-machine channels comprise a random access channel.

20. The apparatus of claim 15 wherein the plurality of machine-to-machine channels comprise a signaling channel.

* * * * *